United States Patent
Ideshio et al.

(10) Patent No.: US 9,421,964 B2
(45) Date of Patent: Aug. 23, 2016

(54) CONTROL APPARATUS FOR HYBRID VEHICLE

(71) Applicant: Toyota Jidosha Kabushiki Kaisha, Toyota-shi, Aichi (JP)

(72) Inventors: Yukihiko Ideshio, Toyota (JP); Terufumi Miyazaki, Toyota (JP); Yuji Inoue, Toyota (JP); Shintaro Matsutani, Toyota (JP); Yousuke Michikoshi, Toyota (JP)

(73) Assignee: TOYOTA JIDOSHA KABUSHIKI KAISHA (JP)

( * ) Notice: Subject to any disclaimer, the term of this patent is extended or adjusted under 35 U.S.C. 154(b) by 93 days.

(21) Appl. No.: 14/150,303

(22) Filed: Jan. 8, 2014

(65) Prior Publication Data

US 2014/0195087 A1 Jul. 10, 2014

Related U.S. Application Data

(60) Provisional application No. 61/750,112, filed on Jan. 8, 2013.

(51) Int. Cl.
*B60W 20/00* (2016.01)
*B60W 10/08* (2006.01)
(Continued)

(52) U.S. Cl.
CPC ................. *B60W 10/08* (2013.01); *B60K 6/48* (2013.01); *B60W 10/02* (2013.01); *B60W 20/00* (2013.01);
(Continued)

(58) Field of Classification Search
CPC ........ B60K 6/48; B60W 10/02; B60W 10/08; B60W 20/40; B60W 30/186; B60W 2510/0291
USPC .......................................................... 701/22
See application file for complete search history.

(56) References Cited

U.S. PATENT DOCUMENTS 5,865,709 A * 2/1999 Tamura ................. B60W 10/02
477/109
7,077,783 B2 * 7/2006 Senger ................. F16D 48/066
192/103 F (Continued)

FOREIGN PATENT DOCUMENTS

| JP | 2008007094 A | 1/2008 |
| JP | 2010143423 A | 7/2010 |
| JP | 2010221853 A | 10/2010 |

OTHER PUBLICATIONS

Machine Translation of Japanese Publication No. 2010-143423 A; Published Jul. 1, 2010.

(Continued)

*Primary Examiner* — John Q Nguyen
*Assistant Examiner* — Nadeem Odeh
(74) *Attorney, Agent, or Firm* — Dinsmore & Shohl LLP

(57) ABSTRACT

A control apparatus for a hybrid vehicle is provided with an engine, an electric motor, and a clutch disposed in a power transmitting path between the engine and the electric motor, a drive mode of the hybrid vehicle being switched on the basis of a required drive force of the hybrid vehicle, between a first drive mode in which said engine is placed in an operated state while said clutch is placed in an engaged state, and a second drive mode in which said electric motor is exclusively used as a drive power source to run the hybrid vehicle while said engine is placed in a rest state and while said clutch is placed in a released state; and a range in which said second drive mode is established being narrower when a temperature of said clutch is comparatively high, than when said temperature is comparatively low.

16 Claims, 6 Drawing Sheets

(51) Int. Cl.
  *B60W 10/02* (2006.01)
  *B60K 6/48* (2007.10)
  *B60W 30/186* (2012.01)
(52) U.S. Cl.
  CPC ..... *B60W 30/186* (2013.01); *B60W 2510/0291* (2013.01); *Y02T 10/6221* (2013.01); *Y10S 903/93* (2013.01)

(56) References Cited

U.S. PATENT DOCUMENTS

| | | | |
|---|---|---|---|
| 8,504,260 B2* | 8/2013 | Stepper et al. | ................. 701/51 |
| 2007/0272456 A1 | 11/2007 | Shiiba | |
| 2008/0154455 A1* | 6/2008 | Hidaka | ................... B60K 6/48 701/22 |
| 2010/0100289 A1* | 4/2010 | Tawara | ............... F16H 61/0213 701/52 |
| 2010/0248893 A1* | 9/2010 | Shimanaka | .............. B60K 6/48 477/5 |
| 2011/0054753 A1* | 3/2011 | Burns | ................... B60W 10/06 701/68 |

OTHER PUBLICATIONS

Machine Translation of Japanese Publication No. 2010-221853 A; Published Oct. 7, 2010.

* cited by examiner

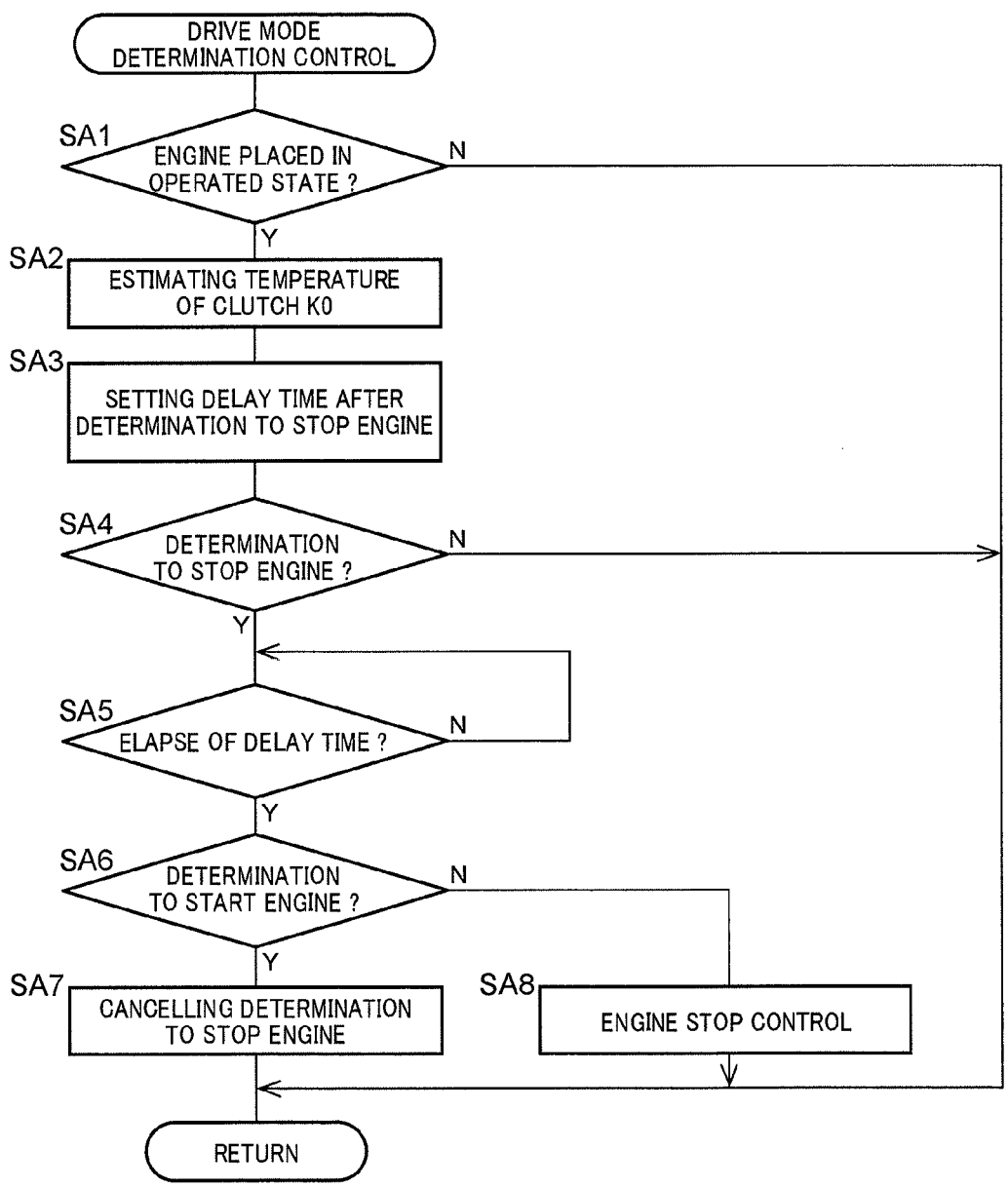

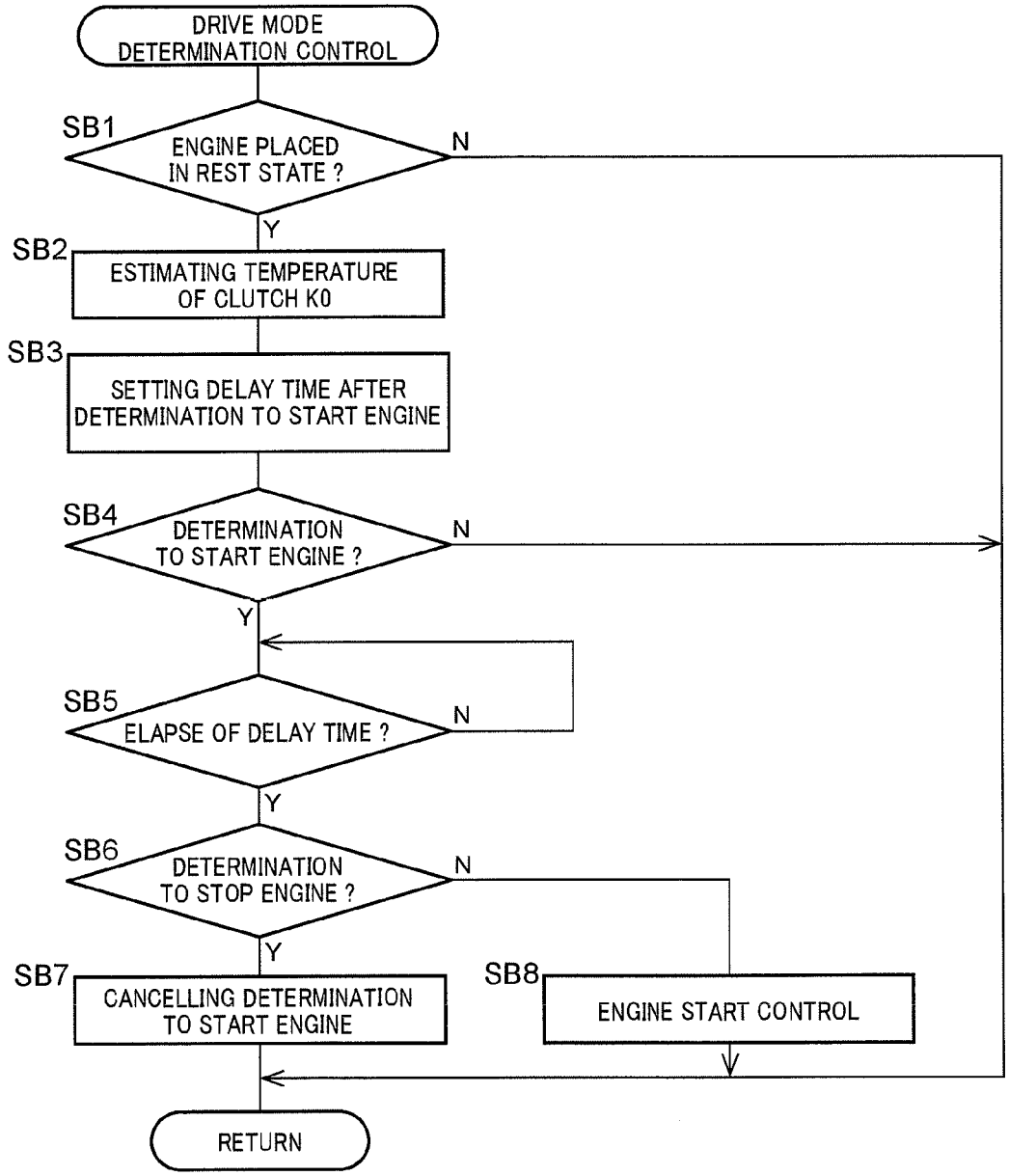

CONTROL APPARATUS FOR HYBRID VEHICLE

CROSS REFERENCE TO RELATED APPLICATIONS

The present specification claims priority to U.S. Provisional Patent Application Ser. No. 61/750,112 filed Jan. 8, 2013 and entitled "CONTROL DEVICE FOR HYBRID VEHICLE," the entirety of which is incorporated by reference herein.

TECHNICAL FIELD

The present specification relates to a control apparatus for a hybrid vehicle provided with a clutch disposed in a power transmitting path between an engine and an electric motor, and more particularly to an improvement for increasing durability of the clutch while reducing deterioration of fuel economy of the hybrid vehicle.

BACKGROUND

There is known a drive system for a hybrid vehicle, which is provided with an engine, an electric motor, and a clutch disposed in a power transmitting path between the engine and the electric motor. In the field of such type of hybrid vehicle drive system, there has been proposed a technique to switch a drive mode on the basis of an operation amount of an accelerator pedal, between an engine drive mode in which the engine is placed in its operated state while the clutch is placed in its engaged state, and a motor drive mode in which the electric motor is exclusively used as a drive power source while the engine is placed in its rest state and while the clutch is placed in its released state. Patent Document 1 discloses an example of such a drive mode switching control device for a hybrid vehicle.

PRIOR ART DOCUMENTS

Patent Documents

Patent Document 1: JP-2010-221853A
Patent Document 2: JP-2008-007094A
Patent Document 3: JP-2010-143423A

SUMMARY

The hybrid vehicle drive system described above has a risk of deterioration of durability of the clutch due to a large amount of generation of heat caused by frequent start and stop operations of the engine which take place due to frequent variation of a required vehicle drive force for repeated alternate starts and stops of the vehicle running in a traffic jam, for instance. On the other hand, inhibition of switching of the vehicle drive mode in such a running condition leads to deterioration of the fuel economy of the vehicle. This problem was found as a result of an intensive study in an effort to improve the performance of the vehicle.

The embodiments described herein were made in view of the background art described above and provide a control apparatus for a hybrid vehicle, which permits an improvement of durability of the clutch while reducing deterioration of the fuel economy of the hybrid vehicle.

A first aspect of the present specification provides a control apparatus for a hybrid vehicle provided with an engine, an electric motor, and a clutch disposed in a power transmitting path between the engine and the electric motor, characterized in that a drive mode of the hybrid vehicle is switched on the basis of a required drive force of the hybrid vehicle, between a first drive mode in which the engine is placed in an operated state while the clutch is placed in an engaged state, and a second drive mode in which the electric motor is exclusively used as a drive power source to run the hybrid vehicle while the engine is placed in a rest state and while the clutch is placed in a released state, and in that a range (region) in which the second drive mode is established is narrower when a temperature of the clutch is comparatively high, than when the temperature is comparatively low.

According to the first aspect, the vehicle drive mode is switched on the basis of the required drive force of the hybrid vehicle, between the first drive mode in which the engine is placed in the operated state while the clutch is placed in the engaged state, and the second drive mode in which the electric motor is exclusively used as the drive power source to run the hybrid vehicle while the engine is placed in the rest state and while the clutch is placed in the released state, and the range (region) in which the second drive mode is established is narrower when the temperature of the clutch is comparatively high, than when the temperature is comparatively low. Accordingly, the present control apparatus makes it possible to reduce the number of the engaging and releasing actions of the clutch, for reducing the amount of generation of heat by the clutch, while assuring an opportunity of switching the vehicle drive mode, and to improve the fuel economy of the hybrid vehicle and reduce deterioration of the durability of the clutch. Namely, the present specification provides the control apparatus for the hybrid vehicle, which permits an improvement of the durability of the clutch while reducing the deterioration of the fuel economy of the hybrid vehicle.

According to a second aspect of the specification dependent on the first aspect, at least one of the required drive force of the hybrid vehicle that is a basis for determination of a need for switching the drive mode from the first drive mode to the second drive mode, and the required drive force that is a basis for determination of a need for switching the drive mode from the second drive mode to the first drive mode is smaller when the temperature of the clutch is comparatively high, than when the temperature is comparatively low. This second aspect makes it possible to practically reduce the number of the engaging and releasing actions of the clutch, for reducing the amount of generation of heat by the clutch, while assuring the opportunity of switching the vehicle drive mode.

According to a third aspect of the specification dependent on the first or second aspect, upon determination of a need for switching the drive mode between the first drive mode and the second drive mode, a moment of generation of a command for switching the drive mode is delayed such that a length of time of the delay increases depending upon a rise of the temperature of the clutch. This third aspect makes it possible to practically reduce the number of the engaging and releasing actions of the clutch, for reducing the amount of generation of heat by the clutch, while assuring the opportunity of switching the vehicle drive mode.

According to a fourth aspect of the specification dependent on the third aspect, the above-indicated command is not generated if the required drive force of the hybrid vehicle has changed with a result of failing to satisfy a predetermined condition for the determination of the above-indicated need, before generation of the command. This fourth aspect of the specification makes it possible to practically reduce the number of the engaging and releasing actions of the clutch, for reducing the amount of generation of heat by the clutch, while assuring the opportunity of switching the vehicle drive mode.

BRIEF DESCRIPTION OF THE DRAWINGS

FIG. 6 is a flow chart of an example of a drive mode determination control implemented by the electronic control device of FIG. 2; and FIG. 7 is a flow chart of an example of another drive mode determination control implemented by the electronic control device of FIG. 2.

DETAILED DESCRIPTION

Figure 1:
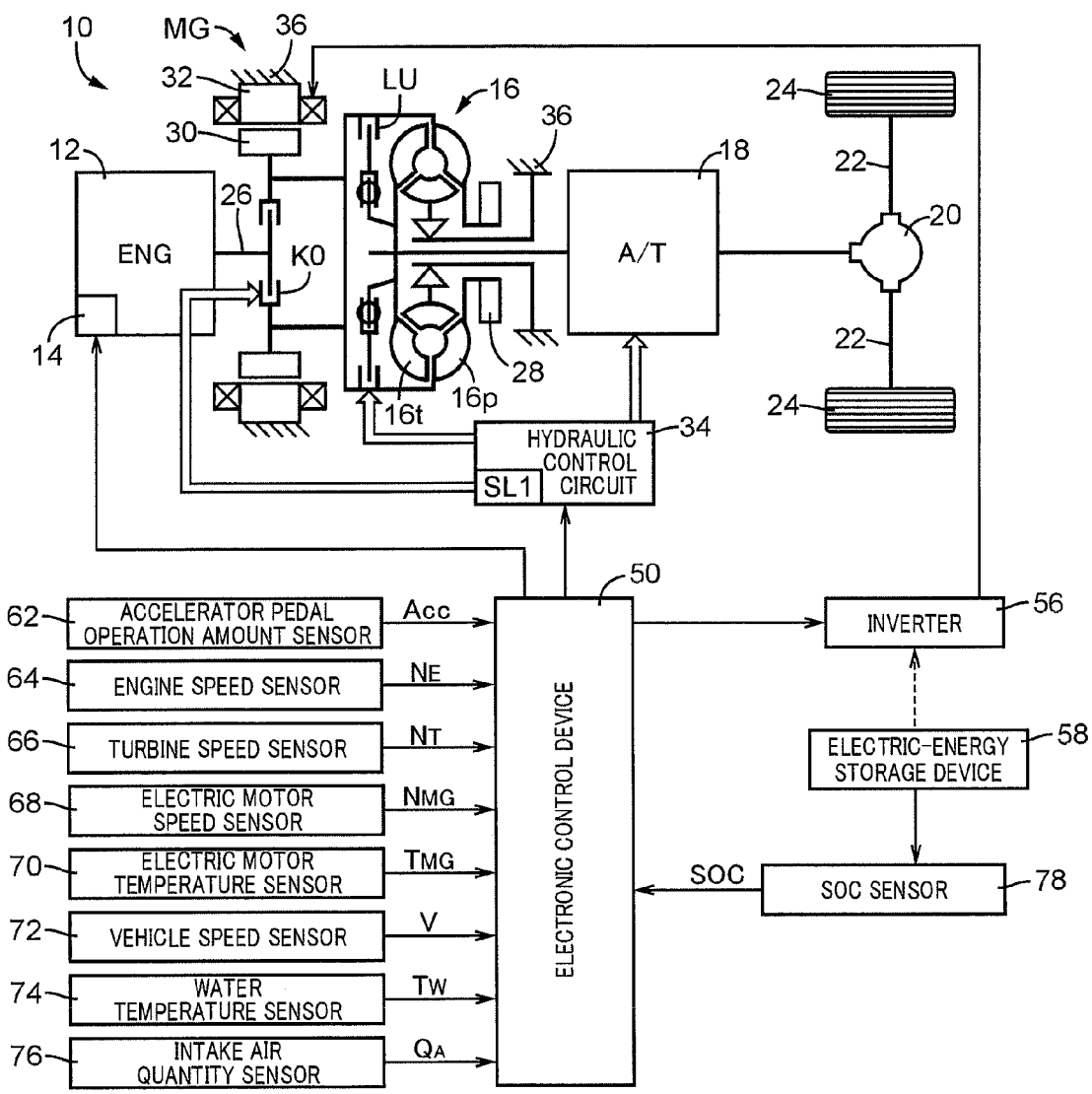
FIG. 1 is a schematic view showing an arrangement of a drive system of a hybrid vehicle to which the present specification is suitably applicable.

The systems and apparatuses described herein are suitably applicable to a hybrid vehicle constructed such that a crankshaft of the engine is connected to a rotor of the electric motor through the clutch, and is provided with a torque converter and an automatic transmission which are disposed in a power transmitting path between the rotor and vehicle drive wheels. However, the systems and apparatuses described herein are also applicable to hybrid vehicles in which the automatic transmission is disposed in a power transmitting path between the electric motor and the vehicle drive wheels, in the absence of the torque converter.

In one embodiment, the first drive mode corresponds to an engine drive mode exclusively using the engine as a drive power source, and a hybrid drive (EHV drive) mode using the engine and electric motor as drive power sources. The second drive mode corresponds to an EV drive (motor drive) mode exclusively using the electric motor as a drive power source.

In another embodiment, the required drive force that is the basis used to determine the need for switching the vehicle drive mode from the second drive mode to the first drive mode is smaller when the operating speed of the electric motor is comparatively high than when the operating speed of the electric motor is comparatively low.

In a further embodiment, the required drive force that is the basis used to determine the need for switching the vehicle drive mode from the first drive mode to the second drive mode is smaller when the operating speed of the engine is comparatively high than when the operating speed of the engine is comparatively low.

In a still further embodiment, the determination to stop the engine, that is, the command for switching the vehicle drive mode from the first drive mode to the second drive mode is cancelled if the basis for determining the need for switching the vehicle drive mode from the second drive mode to the first drive mode, that is, for starting the engine, is satisfied after elapsing of the length of time of delay of generation of the command for switching the vehicle drive mode from the first drive mode to the second drive mode, that is, the command for stopping the engine, the length of time of delay depending upon the temperature of the clutch.

In a yet further embodiment, the determination to start the engine, that is, the command for switching the vehicle drive mode from the second drive mode to the first drive mode is cancelled if the basis for determining the need for switching the vehicle drive mode from the first drive mode to the second drive mode, that is, for stopping the engine is satisfied after elapsing of the length of time of delay of generation of the command for switching the vehicle drive mode from the second drive mode to the first drive mode, that is, the command for starting the engine, the length of time of delay depending upon the temperature of the clutch.

An exemplary embodiment of the control apparatus will now be described in further detail by reference to the drawings. However, it should be understood that other embodiments of the control apparatus are contemplated.

FIG. 1 is a schematic view showing an arrangement of a drive system of a hybrid vehicle 10 to which the present specification is suitably applicable. As shown in FIG. 1, the hybrid vehicle 10 is provided with an engine 12 and an electric motor MG, which function as vehicle drive power sources. Drive forces generated by the engine 12 and the electric motor MG are transmitted to a pair of left and right drive wheels 24 through a torque converter 16, an automatic transmission 18, a differential gear device 20, and a pair of left and right axles 22. The electric motor MG, torque converter 16 and automatic transmission 18 are accommodated in a transmission casing 36. This transmission casing 36 is an aluminum split casing formed by die casting and is fixed to a stationary member such as a vehicle body. In the hybrid vehicle 10 arranged as described above, at least one of the engine 12 and electric motor MG is used as the drive power source. Namely, the hybrid vehicle 10 is configured to selectively establish one of a plurality of drive modes such as: an engine drive mode in which the engine 12 is exclusively used as the drive power source; an EV drive (motor drive) mode in which the electric motor MG is exclusively used as the drive power source; and a hybrid drive (EHV drive) mode in which the engine 12 and electric motor MG are used as the drive power sources.

For example, the engine 12 is an internal combustion engine such as a gasoline or diesel engine of a direct injection type in which a fuel is directly injected into its combustion chambers. To control an operation (output torque) of the engine 12, there is provided an output control device 14 provided with a throttle actuator for opening and closing an electronic throttle valve, a fuel injecting device for implementing a fuel injection control, an igniting device for implementing an ignition timing control, etc. The output control device 14 is controlled according to commands supplied from an electronic control device 50 described below, to control the output of the engine 12, by controlling the throttle actuator to open and close the electronic throttle valve, controlling the fuel injecting device to control the injection of the fuel, and controlling the igniting device to control the ignition timing.

Between a pump impeller 16p and a turbine impeller 16t of the torque converter 16, there is provided a lock-up clutch LU configured to connect the pump and turbine impellers 16p, 16t directly to each other so that the impellers 16p, 16t are rotated as a unit. This lock-up clutch LU is controlled to be placed in one of an engaged state (fully engaged state), a slipping state and a released state (fully released state), according to a hydraulic pressure received from a hydraulic control circuit 34. To the pump impeller 16p of the torque converter 16, there is connected a mechanical oil pump 28 which is operated by a rotary motion of the pump impeller 16p to generate the hydraulic pressure to be applied to and controlled by the hydraulic control circuit 34.

For example, the automatic transmission 18 is a step-variable automatic transmission which is shifted to a selected one of a plurality of predetermined speed positions (speed ratios), and which is provided with a plurality of coupling elements for performing the shifting actions. For instance, the automatic transmission 18 is provided with a plurality of hydraulically operated frictional coupling devices such as multiple-disk clutches and brakes, which are placed in their engaged and released states by respective hydraulic actuators. These frictional coupling devices are selectively engaged and released according to hydraulic pressures applied thereto from the hydraulic control circuit 34, to selectively establish a plurality of forward drive speed positions or gear positions (first through sixth speed positions, for example) and a rear drive position or gear position, according to respective combinations of the engaged and released states of the hydraulically operated frictional coupling devices.

The electric motor MG is a motor/generator which is provided with a rotor 30 supported by the transmission casing 36 rotatably about its axis, and a stator 32 integrally fixed to the transmission casing 36 radially outwardly of the rotor 30, and which functions as an electric motor which generates a drive force, and an electric generator which generates a reaction force. This electric motor MG is connected through an inverter 56 to an electric energy storage device 58 such as a battery or capacitor, and an operation of the electric motor MG is controlled by the electronic control device 50 described below, which regulates an amount of a drive current to be applied through the inverter 56 to a coil of the electric motor MG. In other words, the output torque of the electric motor MG is increased and reduced through the inverter 56.

In a power transmitting path between the engine 12 and electric motor MG, there is disposed a clutch K0 to control transmission of power through that power transmitting path depending upon its operating state. Namely, an output member of the engine 12 in the form of a crankshaft 26 is selectively connected to the rotor 30 of the electric motor MG through the clutch K0. The rotor 30 of the electric motor MG is fixed to an input member of the torque converter 16 in the form of a front cover. For example, the clutch K0 is a hydraulically operated frictional coupling device of a multiple-disk type which is operated by a hydraulic actuator, that is, selectively placed in one of an engaged state (fully engaged state), a slipping state and a released state (fully released state) according to the hydraulic pressure received from the hydraulic control circuit 34. That is, a torque capacity of the clutch K0 is controlled according to the hydraulic pressure received from the hydraulic control circuit 34. A power transmitting path between the crankshaft 26 and the front cover of the torque converter 16 is placed in a power transmitting state (connected state) when the clutch K0 is placed in the engaged state, and in a power cut-off state when the clutch K0 is placed in the released state. When the clutch K0 is placed in the slipping state, the state of power transmission through the power transmitting path between the crankshaft 26 and the front cover of the torque converter 16 varies with the torque capacity of the clutch K0 (changes with the torque transmitted through the clutch K0).

The hybrid vehicle 10 is provided with the control system shown in FIG. 1. The electronic control device 50 shown in FIG. 1 includes a so-called microcomputer incorporating a CPU, a RAM, a ROM and an input-output interface. The CPU performs signal processing operations according to programs stored in the ROM, while utilizing a temporary data storage function of the RAM, to implement various controls such as an operating control of the engine 12, an operating control of the electric motor MG, a shifting control of the automatic transmission 18, an engaging force control of the clutch K0, and an engaging control of the lock-up clutch LU. This electronic control device 50 is constituted by a plurality of control units, as needed, such as a unit for controlling the engine 12, a unit for controlling the electric motor MG, and a unit for controlling the automatic transmission 18. These control units may be configured to implement respective control operations, while effecting mutual communications. In this embodiment, the electronic control device 50 corresponds to a control apparatus for the hybrid vehicle 10.

As indicated in FIG. 1, the electronic control device 50 receives various input signals generated by respective sensors provided in the hybrid vehicle 10, such as: an output signal of an accelerator pedal operation amount sensor 62 indicative of an operation amount $A_{cc}$ of an accelerator pedal (not shown); an output signal of an engine speed sensor 64 indicative of an operating speed $N_E$ of the engine 12 (engine speed $N_E$); an output signal of a turbine speed sensor 66 indicative of a rotating speed $N_T$ of the turbine impeller 16t of the torque converter 16 (turbine speed $N_T$); an output signal of an electric motor speed sensor 68 indicative of an operating speed $N_{MG}$ of the electric motor MG (electric motor speed $N_{MG}$); an output signal of an electric motor temperature sensor 70 indicative of a temperature $T_{MG}$ of the electric motor MG; an output signal of a vehicle speed sensor 72 indicative of a vehicle running speed V; an output signal of a water temperature sensor 74 indicative of a cooling water temperature $T_W$ of the engine 12; an output signal of an intake air quantity sensor 76 indicative of an intake air quantity $Q_A$ of the engine 12; and an output signal of an SOC sensor 78 indicative of a stored electric energy amount (residual energy amount or charging amount) SOC of the electric energy storage device 58.

The electronic control device 50 generates various signals to be applied to respective devices provided in the hybrid vehicle 10, such as: signals to be applied to the output control device 14 for the engine 12, to control the operation of the engine 12; a signal to be applied to the inverter 56, to control the operation of the electric motor MG; signals to be applied to a plurality of electromagnetic control valves provided in the hydraulic control circuit 34, to control the shifting actions of the automatic transmission 18; a signal to be applied to a linear solenoid valve SL1 provided in the hydraulic control circuit 34 to control the engaging action of the clutch K0; a signal to be applied to a linear solenoid valve provided in the hydraulic control circuit 34 to control the engaging action of the lock-up clutch LU; and a signal to be applied to a linear solenoid valve provided in the hydraulic control circuit 34 to control a line pressure.

Figure 2:
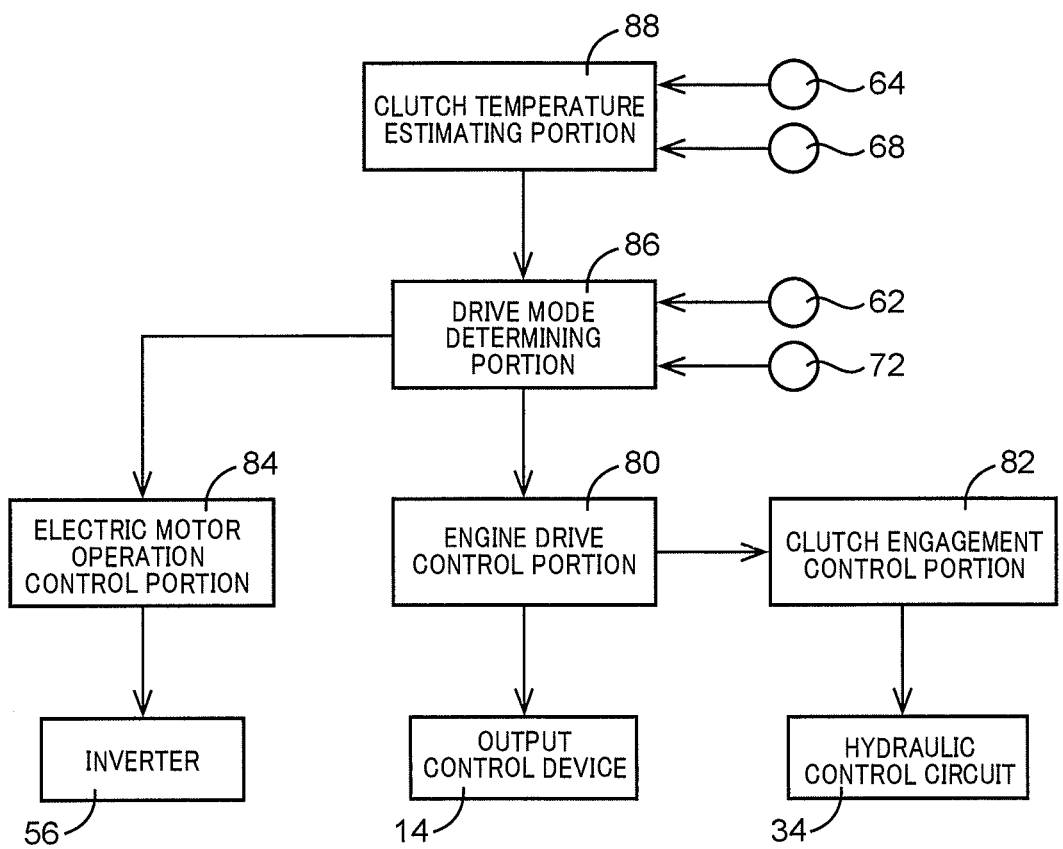
FIG. 2 is a functional block diagram of an electronic control device of the hybrid vehicle of FIG. 1.

FIG. 2 is the functional block diagram for explaining major control functions of the electronic control device 50. An engine drive control portion 80 indicated in FIG. 2 is configured to control an operation (an output torque) of the engine 12 through the output control device 14. Described more specifically, the engine drive control portion 80 commands the output control device 14 for the engine 12, to control an opening angle $\theta_{TH}$ of the electronic throttle valve, an amount of fuel supplied by the fuel injecting device, and the timing of the ignition by the igniting device, for controlling the operation of the engine 12 so as to generate a required output, namely, a target output.

The engine drive control portion 80 operates the engine 12 in the engine drive mode and hybrid drive (EHV drive) mode. That is, the engine drive control portion 80 implements an engine starting control to start the engine 12 when the vehicle drive mode is switched from the EV drive mode to the engine drive mode or hybrid drive mode. For example, the engine drive control portion 80 starts the engine 12 by placing the clutch K0 in the engaged state. Namely, the engine drive control portion 80 commands a clutch engagement control portion 82 described below, to place the clutch K0 in the slipping state or fully engaged state, for causing a rotary motion of the engine 12 with a torque transmitted thereto through the clutch K0. In embodiments, the clutch K0 is held in the slipping state for at least a suitable length of time in the process of a change from the released state to the engaged state, for reducing a shock. A rise of the engine speed $N_E$ by the rotary motion, and initiation of the engine ignition and fuel supply through the output control device 14 permit the engine 12 to be operated by itself.

The engine drive control portion 80 holds the engine 12 in the rest state in the EV drive mode. That is, the engine drive control portion 80 implements an engine stopping control to stop the engine 12 when the vehicle drive mode is switched from the engine drive mode or hybrid drive mode to the EV drive mode. For instance, the engine drive control portion 80 places the clutch K0 in the released state, and stops the operation of the engine 12. Namely, the engine drive control portion 80 commands the clutch engagement control portion 82 described below, to place the clutch K0 in the slipping state or fully released state, and commands the output control device 14 to stop the engine ignition and fuel supply. In embodiments, the clutch K0 is held in the slipping state for at least a suitable length of time in the process of a change from the engaged state to the released state, for reducing a shock.

The clutch engagement control portion 82 is configured to implement an engagement control of the clutch K0, through the linear solenoid valve SL1 provided in the hydraulic control circuit 34. That is, the clutch engagement control portion 82 controls a command value for the linear solenoid valve SL1 (i.e., an amount of electric current to be applied to its solenoid coil), for controlling the hydraulic pressure to be applied from the linear solenoid valve SL1 to a hydraulic actuator provided for the clutch K0. By this hydraulic pressure control, the clutch K0 is placed in one of the engaged state (fully engaged state), slipping state and released state (fully released state). By this clutch engagement control by the clutch engagement control portion 82, the torque capacity of the clutch K0 (the torque transmitted through the clutch K0) is controlled according to the hydraulic pressure applied from the linear solenoid valve SL1 to the clutch K0. In other words, the clutch engagement control portion 82 is a clutch torque capacity control portion which commands the linear solenoid valve SL1 provided in the hydraulic control circuit 34, to control the torque capacity of the clutch K0.

An electric motor operation control portion 84 is configured to control the operation of the electric motor MG through the inverter 56. More specifically, the electric motor operation control portion 84 commands the inverter 56 to supply electric energy from the electric energy storage device 58 to the electric motor MG, permitting the electric motor MG to generate a required output, namely, a target electric motor output, and commands the inverter 56 to operate the electric motor MG to generate electric energy to be stored in the electric energy storage device 58.

A drive mode determining portion 86 is configured to determine the drive mode of the hybrid vehicle 10 to be established, on the basis of the required drive force of the hybrid vehicle, etc. More specifically, the drive mode determining portion 86 selects one of the engine drive mode, EV drive mode and hybrid drive (EHV drive) mode of the hybrid vehicle 10, on the basis of the vehicle running speed V and the required vehicle drive force in the form of the accelerator pedal operation amount $A_{cc}$, and according to a predetermined relationship. The required vehicle drive force used as a basis for determining the drive mode may be an amount of depression of the accelerator pedal detected by an accelerator pedal stroke sensor (not shown), or the angle of opening of the electronic throttle valve.

In other words, the drive mode determining portion 86 is configured to determine, on the basis of the required vehicle drive force in the form of the accelerator pedal operation amount $A_{cc}$, a need for switching the vehicle drive mode between a first drive mode in which the engine 12 is placed in the operated state while the clutch K0 is placed in the engaged state, and a second drive mode in which the electric motor MG is exclusively used as the drive power source to run the hybrid vehicle while the engine 12 is placed in the rest state and while the clutch K0 is placed in the released state. The engine drive mode and the hybrid drive mode correspond to the first drive mode, while the EV drive mode corresponds to the second drive mode.

A clutch temperature estimating portion 88 is configured to estimate a temperature of the clutch K0. In embodiments, the clutch temperature estimating portion 88 estimates the temperature of the clutch K0 on the basis of an input-output speed difference $\Delta N$ of the clutch K0, that is, a difference between the engine speed $N_E$ and the electric motor speed $N_{MG}$. For instance, the clutch temperature estimating portion 88 repeatedly calculates an estimated temperature Tc of the clutch K0 at the time of its next engaging action, with a predetermined calculation cycle time, such as several hundreds of milliseconds to greater than several thousands of milliseconds, according to the functional equations or maps (1)-(3) (shown below), and on the basis of the actual operating speed $N_{MG}$ (rpm) of the electric motor MG detected by the electric motor speed sensor 68, the actual operating speed $N_E$ (rpm) of the engine 12 detected by the engine speed sensor 64, a transmitted torque TR (Nm) of the clutch K0, an actual temperature Toil (° C.) of the working oil detected by an oil temperature sensor (not shown), etc.

$$Tc = Tc^{-1} + \Delta Tu - \Delta Td \quad (1)$$

$$\text{where, } \Delta Tu = f((N_{MG} - N_E), TQ)/Cc \quad (2)$$

$$\Delta Td = \gamma \times S \times (Tc^{-1} - Toil) \quad (3)$$

In equation (1), $Tc^{-1}$ represents the estimated temperature (initial value=ambient temperature) of the clutch K0 calculated in the preceding calculation cycle, and $\Delta Tu$ represents an estimated amount of rise of the temperature of the clutch K0 from a point of time of the preceding calculation cycle, while $\Delta Td$ represents an estimated amount of drop of the temperature of the clutch K0 from the point of time of the preceding calculation cycle. In equation (2), TQ represents the transmitted torque of the clutch K0 (which is equal to the cranking torque at the time of starting of the engine 12, for example), and $C_C$ represents a thermal capacity (cal/° C.) of the clutch K0. In equation (3), γ represents thermal conductivity of the clutch K0, and S represents a surface area of the clutch K0. In equation (2), the transmitted torque TQ of the clutch K0 is a torque at the time of starting the engine, which may be a constant value but can be calculated on the basis of a command value of the hydraulic pressure of the clutch K0 and according to a predetermined experimental equation. In equation (2), $f((N_{MG} - N_E), TQ)$ is a predetermined experimental formula for calculating an amount (cal) of heat generation by the clutch K0 as a function of the speed difference ($N_{MG}-N_E$) and the transmitted torque TQ of the clutch K0 corresponding to the engaging force. At the time of starting the engine 12, its operating speed $N_E$ is between 0 and about several hundreds of rpm. In equations (2) and (3), $C_C$, α and S are constants, while $N_{MG}$, $N_E$, TQ and Toil are variables, so that the estimated temperature Tc of the clutch K0 can be stored as a function F of the variables, according to the functional equation or data map (4) (shown below) obtained from equation (1). Those variables $N_{MG}$, $N_E$, TQ and Toil are parameters actually influencing the temperature Tc of the clutch K0, and are repeatedly obtained in each calculation cycle, as average values, from the point of time of the preceding calculation cycle, for example.

$$Tc=F(N_{MG}, N_E, TQ \text{ and } Toil) \qquad (4)$$

The clutch temperature estimating portion 88 may estimate the temperature Tc of the clutch K0 according to relationships other than those of equations (1)-(4). For instance, the clutch temperature estimating portion 88 may be configured to calculate an integral value of the speed difference ΔN (=|$N_{MG}$−$N_E$|) of the clutch K0 within a predetermined length of time, and to calculate the estimated temperature Tc of the clutch K0 on the basis of the calculated integral value and according to a predetermined relationship. In this case, the estimated temperature Tc of the clutch K0 is calculated so as to increase with an increase of the integral value of the speed difference ΔN. Alternatively, the clutch temperature estimating portion 88 determines an actual temperature of the clutch K0 detected by a clutch temperature sensor, as the estimated temperature Tc of the clutch K0.

The drive mode determining portion 86 changes, according to the estimated temperature Tc of the clutch K0, the basis for switching the vehicle drive mode between the first drive mode in which the engine 12 is placed in the operated state while the clutch K0 is placed in the engaged state, and the second drive mode in which the electric motor MG is exclusively used as the drive power source to run the hybrid vehicle while the engine 12 is placed in the rest state and while the clutch K0 is placed in the released state. More specifically, the drive mode determining portion 86 changes (sets) the relationship that is the basis for switching the vehicle drive mode between the first drive mode and the second drive mode, such that the range (region) (EV drive mode range) in which the second drive mode is established is narrower when the estimated temperature Tc of the clutch K0 is comparatively high, than when the estimated temperature Tc is comparatively low. In embodiments, the drive mode determining portion 86 is configured to change the above-indicated relationship such that the range (region) in which the second drive mode is established is narrower when the estimated temperature Tc of the clutch K0 is equal to or greater than a predetermined threshold value. However, the drive mode determining portion 86 may be configured to change the above-indicated relationship such that the range in which the second drive mode is established is gradually narrowed depending upon (for example, in proportion to) a rise of the estimated temperature Tc of the clutch K0.

Figure 3:
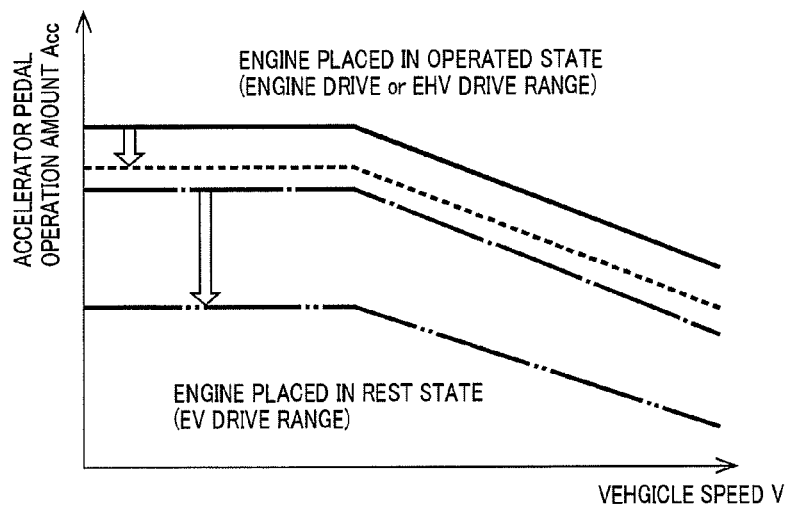
FIG. 3 graphically depicts a control to change a basis for determining a need for switching a drive mode of the hybrid vehicle according to an estimated temperature of a clutch, which control is implemented by the electronic control device of FIG. 2 according to at least one embodiment described herein.

FIG. 3 graphically depicts relationships that are the bases for determining the need for switching the vehicle drive mode between the first drive mode and the second drive mode, and explaining the control implemented in the present embodiment to change the relationships according to the estimated temperature Tc of the clutch K0. In FIG. 3, a solid line represents a line for starting the engine 12, that is, a line for determining the need for switching the vehicle drive mode from the second drive mode to the first drive mode, while a one-dot chain line represents a line for stopping the engine 12, that is, a line for determining the need for switching the vehicle drive mode from the first drive mode to the second drive mode. These lines for determining when to start and stop the engine 12 are used when the estimated temperature Tc of the clutch K0 is equal to a predetermined value Tc1. A broken line represents a line for determining when to start the engine 12 (high-temperature engine start determination line), while a two-dot chain line represents a line for determining when to stop the engine 12 (high-temperature engine stop determination line). These lines for determining when to start and stop the engine 12 are used when the estimated temperature Tc of the clutch K0 is equal to Tc2 higher than the predetermined value Tc1 (when Tc2>Tc1). That is, when the estimated temperature Tc of the clutch K0 rises from the value Tc1 to the value Tc2, the line for determining when to start the engine 12 is shifted from the position indicated by the solid line to the position indicated by the broken line, while the line for determining when to stop the engine 12 is changed from the position indicated by the one-dot chain line to the two-dot chain line.

As indicated in FIG. 3, the relationships that are the bases used by the drive mode determining portion 86 to determine the vehicle drive mode may be formulated such that the required vehicle drive force in the form of the accelerator pedal operation amount $A_{cc}$ of at least one (or both) of the lines for determining when to start and stop the engine 12 is smaller when the estimated temperature Tc of the clutch K0 is comparatively high, than when the temperature Tc is comparatively low. Namely, at least one (or both) of the required vehicle drive force that is the basis for determining the need for switching the vehicle drive mode from the first drive mode to the second drive mode, and the required vehicle drive force that is the basis for determining the need for switching the vehicle drive mode from the second drive mode to the first drive mode is smaller when the estimated temperature Tc of the clutch K0 is comparatively high, than when the temperature Tc is comparatively low. In other words, the required vehicle drive forces used as the bases for determining the need for switching the vehicle drive mode from the first drive mode to the second drive mode and the need for switching the vehicle drive mode from the second drive mode to the first drive mode are smaller when the estimated temperature Tc of the clutch K0 is comparatively high than when the temperature Tc is comparatively low.

In embodiments, the relationships that are the bases used by the drive mode determining portion 86 for determining the vehicle drive mode may be formulated such that at least one of the accelerator pedal operation amount $A_{cc}$ used to determine the need for switching the vehicle drive mode from the first drive mode to the second drive mode, and the accelerator pedal operation amount $A_{cc}$ used to determine the need for switching the vehicle drive mode from the second drive mode to the first drive mode is reduced by a predetermined amount when the estimated temperature Tc of the clutch K0 is equal to or greater than a predetermined amount. However, the amount of reduction of the accelerator pedal operation amount $A_{cc}$ may be gradually increased depending upon (for example, in proportion to) a rise of the estimated temperature Tc of the clutch K0. The amount of reduction of the accelerator pedal operation amount $A_{cc}$ that is the basis for switching the vehicle drive mode may be held constant irrespective of the vehicle running speed. However, the amount of reduction need not be constant irrespective of the vehicle running speed. For instance, the amount of reduction may be comparatively large when the vehicle running speed is comparatively low, and comparatively small when the vehicle running speed is comparatively high. Further, different relationships between the accelerator pedal operation amount $A_{cc}$ and the vehicle running speed V may be predetermined as the bases for determination of the need for switching the vehicle drive mode, such that the different relationships correspond to respective different values of the estimated temperature Tc of the clutch K0. In this case, the determination of the need for switching the vehicle drive mode is made according to one of the different relationships which corresponds to a present value of the estimated temperature Tc. In the example of FIG. 3 showing the relationships at a given value of the estimated temperature Tc of the clutch K0, the amount of reduction of the required vehicle drive force used to determine the need for switching the vehicle drive mode from the first drive mode to the second drive mode (as represented by the engine stop determination line) is larger than the amount of reduction of the required vehicle drive force used to determine the need for switching the vehicle drive mode from the second drive mode to the first drive mode (as represented by the engine start determination line). By changing the bases used by the drive mode determining portion 86 to determine the needs for switching the vehicle drive mode, as described above, the range in which the second drive mode is established, that is, the EV drive mode range is made narrower when the estimated temperature Tc of the clutch K0 is comparatively high, than when the temperature Tc is comparatively low.

In embodiments, the relationships that are the bases used by the drive mode determining portion 86 for determining the vehicle drive mode may be formulated such that the required vehicle drive force in the form of the accelerator pedal operation amount $A_{cc}$ of the line for determining when to start the engine 12 is smaller when the electric motor speed $N_{MG}$ detected by the electric motor speed sensor 68 is comparatively high, than when the electric motor speed $N_{MG}$ is comparatively low. Namely, the required vehicle drive force that is the basis for determining the need for switching the vehicle drive mode from the second drive mode to the first drive mode is smaller when the electric motor speed $N_{MG}$ is comparatively high, than when the electric motor speed $N_{MG}$ is comparatively low. In embodiments, the accelerator pedal operation amount $A_{cc}$ used to determine the need for switching the vehicle drive mode from the second drive mode to the first drive mode is reduced by a predetermined amount when the electric motor speed $N_{MG}$ is equal to or greater than a predetermined amount. However, the amount of reduction of the accelerator pedal operation amount $A_{cc}$ may be gradually increased depending upon (for example, in proportion to) a rise of the electric motor speed $N_{MG}$.

In embodiments, the relationships that are the bases used by the drive mode determining portion 86 for determining the vehicle drive mode may be formulated such that the required vehicle drive force in the form of the accelerator pedal operation amount $A_{cc}$ of the line for determining when to stop the engine 12 is smaller when the engine speed $N_E$ is comparatively high, than when the engine speed $N_E$ is comparatively low. Namely, the required vehicle drive force that is the basis for determining the need for switching the vehicle drive mode from the first drive mode to the second drive mode is smaller when the engine speed $N_E$ is comparatively high, than when the engine speed $N_E$ is comparatively low. In embodiments, the accelerator pedal operation amount $A_{cc}$ used to determine the need for switching the vehicle drive mode from the first drive mode to the second drive mode is reduced by a predetermined amount when the engine speed $N_E$ is equal to or greater than a predetermined amount. However, the amount of reduction of the accelerator pedal operation amount $A_{cc}$ may be gradually increased depending upon (for example, in proportion to) a rise of the engine speed $N_E$.

The drive mode determining portion 86 is further configured such that upon determination of the need for switching the vehicle drive mode between the first drive mode and the second drive mode, the drive mode determining portion 86 delays a moment of generation of a command for switching the vehicle drive mode such that a length of time of the delay is increased depending upon a rise of the estimated temperature Tc of the clutch K0. Namely, the drive mode determining portion 86 delays the moment of generation of a command for switching the vehicle drive mode from the first drive mode to the second drive mode or a command for switching the vehicle drive mode from the second drive mode to the first drive mode, by the length of time which depends upon the estimated temperature Tc of the clutch K0, even if the determination for this switching of the vehicle drive mode has been once determined. In the case of the determination of the need for the switching from the first drive mode to the second drive mode, the above-indicated command is applied to the output control device 14 and hydraulic control circuit 34 to place the clutch K0 in the released state and to stop the engine 12. In the case of the determination of the need for the switching from the second drive mode to the first drive mode, the above-indicated command is applied to the output control device 14 and hydraulic control circuit 34 to place the clutch K0 in the engaged state and to start (drive) the engine 12. In embodiments, the length of time of the delay is gradually increased depending upon (for example, in proportion to) a rise of the estimated temperature Tc of the clutch K0. However, the length of time of the delay may be otherwise determined. For instance, the moment of generation of the command is delayed by a predetermined length of time when the estimated temperature Tc of the clutch K0 is equal to or higher than a predetermined threshold value, and the moment of generation of the command is not delayed when the estimated temperature Tc is lower than the predetermined threshold value.

In embodiments, the drive mode determining portion 86 may be configured not to generate the command for switching the vehicle drive mode between the first drive mode and the second drive mode, if the required vehicle drive force has changed with a result of failing to satisfy a predetermined basis used for the determination of the need for switching the vehicle drive mode, before generation of the command and during the length of time of the delay of the generation. Namely, the command for switching the vehicle drive mode is cancelled in this event. Where the moment of generation of the command for switching the vehicle drive mode between the first drive mode and the second drive mode is delayed, the determination as to whether the vehicle drive mode should be changed between the first drive mode and the second drive mode is again made after elapsing of the length of time of the delay, to determine whether the command for switching the vehicle drive mode according to the previous determination should be generated or not, for example. More specifically, where the determination for switching the vehicle drive mode from the first drive mode to the second drive mode, that is, the determination to stop the engine 12 has been made, and if the determination that the vehicle drive mode should be switched from the second drive mode to the first drive mode, that is, the determination to start the engine 12 is made after elapsing of the length of time of the delay, the command for switching the vehicle drive mode according to the previous determination to stop the engine 12 is cancelled. If the determination that the vehicle drive mode should be switched from the first drive mode to the second drive mode, that is, the determination to stop the engine 12 is not made (if the required vehicle drive force has become larger than the value of the engine stop determination line, for example) after elapsing of the length of time of the delay, the command for switching the vehicle drive mode according to the previous determination to stop the engine 12 may be cancelled. Where the determination for switching the vehicle drive mode from the second drive mode to the first drive mode, that is, the determination to start the engine 12 has been made, and if the determination that the vehicle drive mode should be switched from the first drive mode to the second drive mode, that is, the determination to stop the engine 12 is made after elapsing of the length of time of the delay, the command for switching the vehicle drive mode according to the previous determination to start the engine 12 is cancelled. If the determination that the vehicle drive mode should be switched from the second drive mode to the first drive mode, that is, the determination to start the engine 12 is not made (if the required vehicle drive force has become smaller than the value of the engine start determination line, for example) after elapsing of the length of time of the delay, the command for switching the vehicle drive mode according to the previous determination to start the engine 12 may be cancelled.

Figure 4:
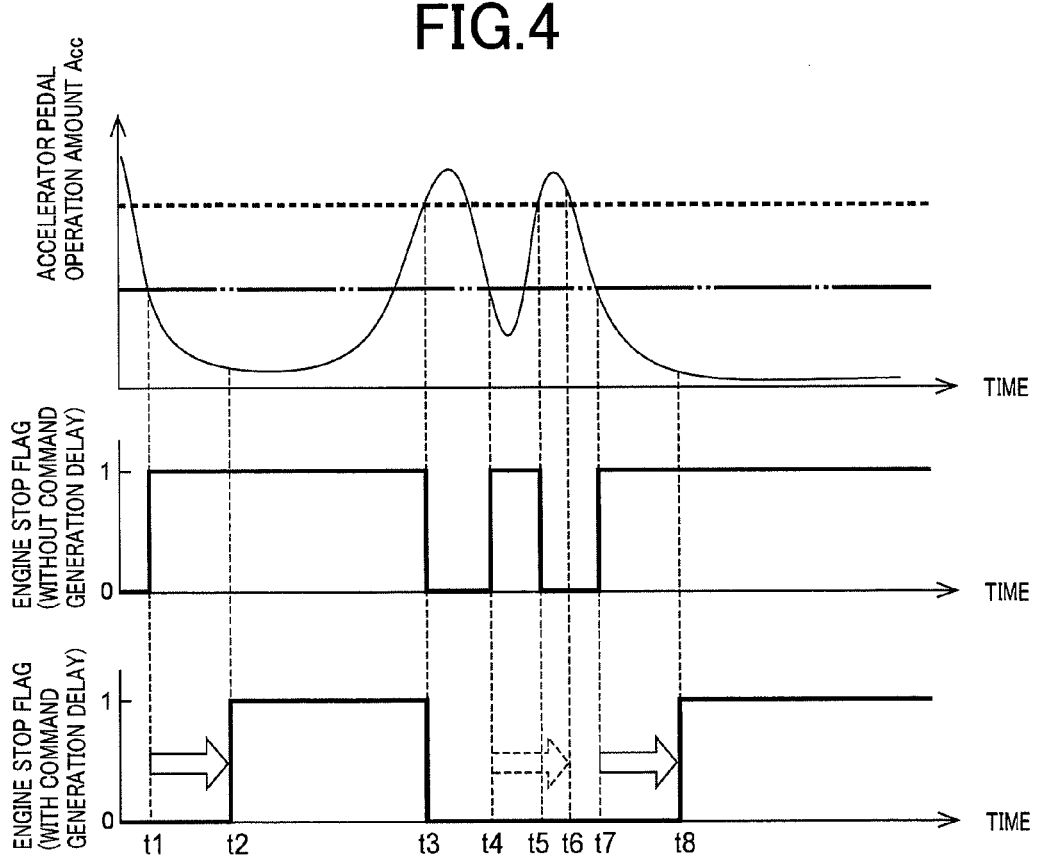
FIG. 4 is graphically depicts a control to delay a moment of generation of a command depending upon an estimated temperature of the clutch and to cancel the command, which control is implemented by the electronic control device of FIG. 2 according to at least one embodiment described herein.

FIG. 4 is a time chart explaining the control to delay the moment of generation of the command for switching the vehicle drive mode depending upon the estimated temperature Tc of the clutch K0 and to cancel the command. A broken line and a two-dot chain line in an upper part of FIG. 4 respectively represent the lines for determining when to start and stop the engine 12, the accelerator pedal operation amounts of which are reduced depending upon the estimated temperature Tc of the clutch K0, according to the control. In the specific example of the control illustrated in FIG. 4, the moment of generation of the command for stopping the engine 12 is delayed depending upon the estimated temperature Tc of the clutch K0, while the moment of generation of the command for starting the engine 12 is not delayed, for the convenience of explanation.

In the example of the control graphically depicted in FIG. 4, the required vehicle drive force in the form of the accelerator pedal operation amount $A_{cc}$ has been reduced below the value of the line for determining when to stop the engine 12 represented by the two-dot chain line, at a point of time t1, so that the determination to stop the engine 12, that is, the determination for switching the vehicle drive mode from the first drive mode to the second drive mode is made. According to the conventional control in which the moment of generation of a drive mode switching command is not delayed, an engine stop flag is set to "1" at the point of time t1 at which the engine stop determination is made, so that an engine stopping command for stopping the engine 12 is immediately generated. According to the control in the present embodiment in which the moment of generation of the drive mode switching command is delayed, on the other hand, the moment of generation of the engine stopping command is delayed by a predetermined length of time from the point of time t1 at which the engine stop determination is made, up to a point of time t2 which is after elapse of the delay, as indicated by a solid arrow. At the point of time t2, the determination as to whether the engine 12 should be stopped is made again. For example, the determination as to whether the accelerator pedal operation amount $A_{cc}$ is larger than the value of the line for starting the engine 12 represented by the broken line is made again. In the specific example of FIG. 4, the accelerator pedal operation amount $A_{cc}$ at the point of time t2 is smaller than the value of the line for determining when to start the engine 12 represented by the broken line, so that the engine stop flag is set to "1" at the point of time t2, at which the engine stopping command for stopping the engine 12 is generated.

At a point of time t3, the accelerator pedal operation amount $A_{cc}$ becomes larger than the value of the line for determining when to start the engine 12 represented by the broken line, so that the determination to start the engine, namely, the determination for switching the vehicle drive mode from the second drive mode to the first drive mode is made. In the example of FIG. 4, the moment of generation of the command for starting the engine 12 is not delayed depending upon the estimated temperature Tc of the clutch K0, so that the engine stop flag is set to "0" at the point of time t3 at which the engine start determination is made, whereby an engine starting command for starting the engine 12 is immediately generated for both of the conventional control and the control in present example.

At a point of time t4, the accelerator pedal operation amount $A_{cc}$ has been reduced below the value of the line for determining when to stop the engine 12 represented by the two-dot chain line, so that the determination to stop the engine 12, that is, the determination for switching the vehicle drive mode from the first drive mode to the second drive mode is made. According to the conventional control in which the moment of generation of the drive mode switching command is not delayed, the engine stop flag is set to "1" at the point of time t4 at which the engine stop determination is made, so that the engine stopping command for stopping the engine 12 is immediately generated. According to the control in the present embodiment in which the moment of generation of the drive mode switching command is delayed, on the other hand, the moment of generation of the engine stopping command is delayed by a predetermined length of time from the point of time t4 at which the engine stop determination is made, up to a point of time t6 which is after elapse of the delay, as indicated by a broken arrow. At the point of time t6, the determination as to whether the engine 12 should be stopped is made again. For example, the determination as to whether the accelerator pedal operation amount $A_{cc}$ is larger than the value of the line for determination to start the engine 12 represented by the broken line is made again. In the specific example of FIG. 4, the accelerator pedal operation amount $A_{cc}$ at the point of time t6 is larger than the value of the line for determination to start the engine 12 represented by the broken line, so that the engine stopping command according to the engine stop determination at the point of time t4 is cancelled, and the engine stop flag is kept at "0".

At a point of time t5, the accelerator pedal operation amount $A_{cc}$ becomes larger than the value of the line for determining when to start the engine 12 represented by the broken line, so that the determination to start the engine, namely, the determination for switching the vehicle drive mode from the second drive mode to the first drive mode is made. According to the conventional control in which the moment of generation of the drive mode switching command is not delayed, the engine stop flag is set to "0" at the point of time t5 at which the engine stop determination is made, so that the engine starting command for starting the engine 12 is immediately generated. According to the control in the present embodiment in which the moment of generation of the drive mode switching command is delayed, on the other hand, the engine starting command is not generated since the point of time t5 is within the length of time of the delay from the point of time t4, and since the engine stop flag is set at "0" at the point of time t5.

At a point of time t7, the accelerator pedal operation amount $A_{cc}$ has been reduced below the value of the line for determination to stop the engine 12 represented by the two-dot chain line, so that the determination to stop the engine 12, that is, the determination for switching the vehicle drive mode from the first drive mode to the second drive mode is made. According to the conventional control in which the moment of generation of the drive mode switching command is not delayed, the engine stop flag is set to "1" at the point of time t7 at which the engine stop determination is made, so that the engine stopping command for stopping the engine 12 is immediately generated. According to the control in the present embodiment in which the moment of generation of the drive mode switching command is delayed, on the other hand, the moment of generation of the engine stopping command is delayed by a predetermined length of time from the point of time t7 at which the engine stop determination is made, up to a point of time t8 which is after elapse of the delay, as indicated by a solid arrow. At the point of time t8, the determination as to whether the engine 12 should be stopped is made again. For example, the determination as to whether the accelerator pedal operation amount $A_{cc}$ is larger than the value of the line for determining when to start the engine 12 represented by the broken line is made again. In the specific example of FIG. 4, the accelerator pedal operation amount $A_{cc}$ at the point of time t8 is smaller than the value of the line for determining when to start the engine 12 represented by the broken line, so that the engine stop flag is set to "1" at the point of time t8, and the engine stopping command for stopping the engine 12 is generated.

The control according to the present embodiment configured to delay the moment of generation of the command for switching the vehicle drive mode as described above by reference to the time chart of FIG. 4 makes it possible to reduce the frequency of starting and stopping operations of the engine 12, as compared with the conventional control in which the moment of generation of the drive mode switching command is not delayed. That is, the present embodiment makes it possible to reduce the frequency of the engaging and releasing actions of the clutch K0, for reducing the amount of generation of heat by the clutch K0. The delay of the moment of generation of the drive mode switching command, along with the reduction of the required vehicle drive force used to determine the need for switching the vehicle drive mode, assures a further improvement of the durability of the clutch K0.

Figure 5:
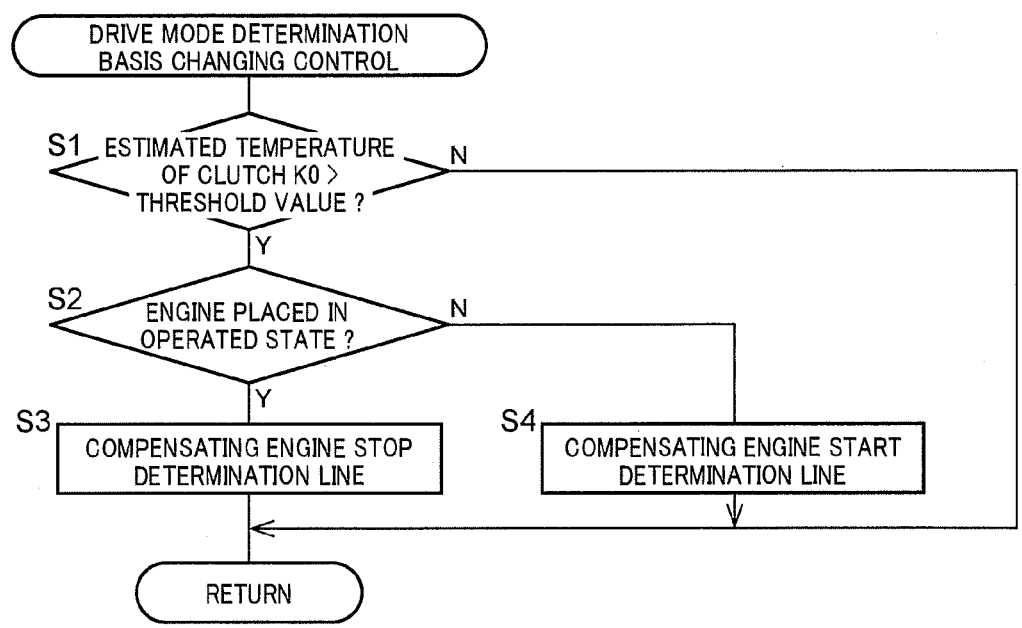
FIG. 5 is a flow chart of an example of a drive mode determination control implemented by the electronic control device of FIG. 2.

FIG. 5 is a flow chart depicting a major portion of an example of a drive mode determination basis changing control which is repeatedly implemented by the electronic control device 50 with a predetermined cycle time.

Initially, step S1 (hereinafter "step" is omitted) is implemented to estimate the temperature Tc of the clutch K0 and to determine whether the estimated temperature Tc is higher than the predetermined threshold value. If a negative determination is obtained in S1, the present control routine is terminated. If an affirmative determination is obtained in S1, the control flow goes to S2 to determine whether the engine 12 is placed in the operated state, namely, whether the hybrid vehicle 10 is placed in the first drive mode (engine drive mode or hybrid drive mode). If an affirmative determination is obtained in S2, the control flow goes to S3 to reduce (compensate) the required vehicle drive force, for example, in the form of the accelerator pedal operation amount $A_{cc}$ of the engine stop determination line that is the basis for determining when to switch the vehicle drive mode from the first drive mode to the second drive mode, and the present control routine is terminated. If a negative determination is obtained in S2, that is, if the hybrid vehicle 10 is placed in the second drive mode (EV drive mode), the control flow goes to S4 to reduce (compensate) the required vehicle drive force, for example, in the form of the accelerator pedal operation amount $A_{cc}$ of the engine start determination line that is the basis for determining when to switch the vehicle drive mode from the second drive mode to the first drive mode, and the present control routine is terminated.

FIG. 6 is a flow chart depicting a major portion of an example of a drive mode determination control (engine stopping control) which is repeatedly implemented by the electronic control device 50 with a predetermined cycle time. The control illustrated in FIG. 6 and the control illustrated in FIG. 7 referred to below are implemented along with the control illustrated in FIG. 5 referred to above. Where the control illustrated in FIG. 5 permits sufficient reduction of generation of heat by the clutch K0, however, the controls illustrated in FIGS. 6 and 7 need not be implemented. Instead, only one of the controls illustrated in FIGS. 6 and 7 (only the control illustrated in FIG. 6, for example) may be implemented.

Initially, SA1 is implemented to determine whether the engine 12 is placed in the operated state, namely, whether the hybrid vehicle 10 is placed in the first drive mode (engine drive mode or hybrid drive mode). If a negative determination is obtained in SA1, the present routine is terminated. If an affirmative determination is obtained in SA1, the control flow goes to SA2 to calculate the estimated temperature Tc of the clutch K0 on the basis of the input-output speed difference $\Delta N$ ($=|N_{MG}-N_E|$) of the clutch K0. Then, SA3 is implemented to set the length of time of the delay of the moment of generation of the command for switching the vehicle drive mode according to the determination to stop the engine 12, depending upon the estimated temperature Tc of the clutch K0 calculated in SA2. SA4 is then implemented to determine whether the determination to stop the engine 12, that is, the determination for switching the vehicle drive mode from the first drive mode to the second drive mode has been made. For instance, this determination may be made by determining whether the vehicle drive force in the form of the accelerator pedal operation amount $A_{cc}$ is smaller than the value of the engine stop determination line. If a negative determination is obtained in SA4, the present control routine is terminated. If an affirmative determination is obtained in SA4, the control flow goes to SA5 to determine whether the length of time of the delay set in SA3 has elapsed after the determination in SA4. If a negative determination is obtained in SA5, this step is repeatedly implemented until an affirmative determination is obtained in the step. If the affirmative determination is obtained in SA5, the control flow goes to SA6 to determine whether the determination to start the engine 12, that is, the determination for switching the vehicle drive mode from the second drive mode to the first drive mode has been made. For instance, this determination is made by determining whether the vehicle drive force in the form of the accelerator pedal operation amount $A_{cc}$ is larger than the value of the engine start determination line (or larger than the value of the engine stop determination line). If an affirmative determination is obtained in SA6, the control flow goes to SA7 to cancel the engine stopping command according to the determination in SA4, and the present control routine is terminated. If a negative determination is obtained in SA6, the control flow goes to SA8 to generate the engine stopping command according to the determination in SA4, for placing the clutch K0 in the released state and placing the engine 12 in the rest state, to maintain the vehicle drive mode exclusively using the electric motor MG as the drive power source, and the present control routine is terminated.

FIG. 7 is a flow chart depicting a major portion of an example of another drive mode determination control (engine starting control) which is repeatedly implemented by the electronic control device 50 with a predetermined cycle time.

Initially, SB1 is implemented to determine whether the engine 12 is placed in the rest state, namely, whether the hybrid vehicle 10 is placed in the second drive mode (EV drive mode). If a negative determination is obtained in SB1, the present routine is terminated. If an affirmative determination is obtained in SB1, the control flow goes to SB2 to calculate the estimated temperature Tc of the clutch K0 on the basis of the input-output speed difference $\Delta N$ ($=|N_{MG}-N_E|$) of the clutch K0. Then, SB3 is implemented to set the length of time of the delay of the moment of generation of the command for switching the vehicle drive mode according to the determination to start the engine 12, depending upon the estimated temperature Tc of the clutch K0 calculated in SB2. SB4 is then implemented to determine whether the determination to start the engine 12, that is, the determination for switching the vehicle drive mode from the second drive mode to the first drive mode has been made. For instance, this determination is made by determining whether the vehicle drive force in the form of the accelerator pedal operation amount $A_{cc}$ is larger than the value of the engine start determination line. If a negative determination is obtained in SB4, the present control routine is terminated. If an affirmative determination is obtained in SB4, the control flow goes to SB5 to determine whether the length of time of the delay set in SB3 has elapsed after the determination in SB4. If a negative determination is obtained in SB5, this step is repeatedly implemented until an affirmative determination is obtained in the step. If the affirmative determination is obtained in SB5, the control flow goes to SB6 to determine whether the determination to stop the engine 12, that is, the determination for switching the vehicle drive mode from the first drive mode to the second drive mode has been made. For instance, this determination may be made by determining whether the vehicle drive force in the form of the accelerator pedal operation amount $A_{cc}$ is smaller than the value of the engine stop determination line. If an affirmative determination is obtained in SB6, the control flow goes to SB7 to cancel the engine starting command according to the determination in SB4, and the present control routine is terminated. If a negative determination is obtained in SB6, the control flow goes to SB8 to generate the engine starting command according to the determination in SB4, for placing the clutch K0 in the engaged state and placing the engine 12 in the operated state, and the present control routine is terminated.

It will be understood from the foregoing description of the control operations by reference to FIGS. 5-7 that SA8 and SB8 correspond to the engine drive control portion 80 and the clutch engagement control portion 82, while SA8 corresponds to the electric motor operation control portion 84, and that S3, S4, SA3-SA8 and SB3-SB8 correspond to the drive mode determining portion 86, while S1, SA2 and SB2 correspond to the clutch temperature estimating portion 88.

The embodiment described above is configured to switch the vehicle drive mode on the basis of the required vehicle drive force in the form of the accelerator pedal operation amount $A_{cc}$, between the first drive mode in the form of the engine drive mode or hybrid drive mode in which the engine 12 is placed in the operated state while the clutch K0 is placed in the engaged state, and the second drive mode in the form of the EV drive mode in which the electric motor MG is exclusively used as the drive power source to run the hybrid vehicle while the engine 12 is placed in the rest state and while the clutch K0 is placed in the released state, and the range in which the second drive mode is established is narrower when the estimated temperature Tc of the clutch K0 is high, than when the estimated temperature Tc is low. Accordingly, this makes it possible to reduce the number of the engaging and releasing actions of the clutch K0, for reducing the amount of generation of heat by the clutch K0, while assuring an opportunity of switching the vehicle drive mode, and to improve the fuel economy of the hybrid vehicle and reduce deterioration of the durability of the clutch K0. Namely, the present embodiment provides the electronic control device 50 for the hybrid vehicle 10, which permits an improvement of the durability of the clutch K0 while reducing the deterioration of the fuel economy of the hybrid vehicle 10.

The embodiment is further configured such that at least one of the required drive force of the hybrid vehicle that is the basis for determination of the need for switching the vehicle drive mode from the first drive mode to the second drive mode, and the required drive force that is the basis for determination of the need for switching the drive mode from the second drive mode to the first drive mode is smaller when the estimated temperature Tc of the clutch K0 is comparatively high, than when the temperature Tc is comparatively low. Accordingly, the embodiment makes it possible to practically reduce the number of the engaging and releasing actions of the clutch K0, for reducing the amount of generation of heat by the clutch K0, while assuring the opportunity of switching the vehicle drive mode. In particular, the smaller required vehicle drive force is used as the basis for determination of the need for switching the vehicle drive mode from the first drive mode to the second drive mode when the estimated temperature Tc of the clutch K0 is comparatively high than when the temperature Tc is comparatively low, so that the number of determinations of the need for switching the vehicle drive mode is reduced, and the clutch K0 can be released while the operating speed of the engine 12 is comparatively low, whereby the heat generation by the clutch K0 can be effectively reduced. Further, the smaller required vehicle drive force is used as the basis for determination of the need for switching the vehicle drive mode from the second drive mode to the first drive mode when the estimated temperature Tc of the clutch K0 is comparatively high than when the temperature Tc is comparatively low, so that the clutch K0 can be engaged while the operating speed of the electric motor MG is comparatively low, whereby the heat generation by the clutch K0 can be effectively reduced.

The embodiment is also configured such that upon determination of the need for switching the drive mode between the first drive mode and the second drive mode, the moment of generation of the command for switching the drive mode is delayed such that the length of time of the delay increases depending upon a rise of the estimated temperature Tc of the clutch K0. Accordingly, it is possible to practically reduce the number of the engaging and releasing actions of the clutch K0, for reducing the amount of generation of heat by the clutch, while assuring the opportunity of switching the vehicle drive mode.

The embodiment is further configured such that the above-indicated command for switching the vehicle drive mode is not generated if the required drive force of the hybrid vehicle has changed with a result of failing to satisfy a predetermined basis used for the determination of the above-indicated need, before generation of the above-indicated command. Accordingly, it is possible to practically reduce the number of the engaging and releasing actions of the clutch K0, for reducing the amount of generation of heat by the clutch, while assuring the opportunity of switching the vehicle drive mode.

While embodiments have been described in detail with reference to the drawings, it is to be understood that the embodiments are not limited to the details of the embodiment illustrated in the drawings, and may be embodied with various changes, without departing from the spirit and scope of the subject matter described herein.

The invention claimed is:

1. A control apparatus for a hybrid vehicle provided with an engine, an electric motor, and a clutch disposed in a power transmitting path between the engine and the electric motor, the control apparatus comprising a processor and a non-transitory memory module, wherein the non-transitory memory module comprises a set of machine readable instructions that, when executed by the processor:
determine a temperature of the clutch;
determine a required drive force threshold for switching from a first drive mode to a second drive mode or for switching from the second drive mode to the first drive mode based on the temperature of the clutch, wherein in the first drive mode, the engine is placed in an operated state while the clutch is placed in an engaged state, and wherein in the second drive mode, the electric motor is exclusively used as a drive power source to run the hybrid vehicle while the engine is placed in a rest state and while the clutch is placed in a released state;
determine a low temperature engine start drive force threshold for switching from the second drive mode to the first drive mode when the temperature of the clutch is a lower temperature;
determine a high temperature engine start drive force threshold for switching from the second drive mode to the first drive mode when the temperature of the clutch is a higher temperature, wherein the higher temperature is higher than the lower temperature, and wherein the low temperature engine start drive force threshold is greater than the high temperature engine start drive force threshold;
determine a required drive force of the hybrid vehicle;
switch a drive mode of the hybrid vehicle from the first drive mode to the second drive mode or from the second drive mode to the first drive mode based on a comparison of the required drive force of the hybrid vehicle to the required drive force threshold;
switch the drive mode of the hybrid vehicle from the second drive mode to the first drive mode when the required drive force of the hybrid vehicle is greater than the low temperature engine start drive force threshold and the temperature of the clutch is the lower temperature; and
switch the drive mode of the hybrid vehicle from the second drive mode to the first drive mode when the required drive force of the hybrid vehicle is greater than the high temperature engine start drive force threshold and the temperature of the clutch is the higher temperature.

2. The control apparatus according to claim 1, wherein the set of machine readable instructions, when executed by the processor:
determine the required drive force threshold to be a smaller required drive force threshold when the temperature of the clutch is a higher temperature; and
determine the required drive force threshold to be a larger required drive force threshold when the temperature of the clutch is a lower temperature, wherein the higher temperature is higher than the lower temperature, and wherein the larger required drive force threshold is greater than the smaller required drive force threshold.

3. The control apparatus according to claim 1, wherein the set of machine readable instructions, when executed by the processor:
determine a need for switching the drive mode between the first drive mode and the second drive mode; and
delay generation of a command for switching the drive mode such that a length of time of the delay increases depending upon a rise of the temperature of the clutch.

4. The control apparatus according to claim 3, wherein the set of machine readable instructions, when executed by the processor:
before generation of the command for switching the drive mode, determine whether the need for switching the drive mode continues to exist; and
cancel the command for switching the drive mode when the need for switching the drive mode is determined not to continue to exist.

5. The control apparatus according to claim 1, further comprising a clutch temperature sensor, wherein the set of machine readable instructions, when executed by the processor, determine the temperature of the clutch based on an output of the clutch temperature sensor.

6. The control apparatus according to claim 1, further comprising a linear solenoid valve hydraulically coupled to a hydraulic actuator provided for the clutch, wherein the set of machine readable instructions, when executed by the processor:
switch the drive mode of the hybrid vehicle by controlling an amount of electric current applied to the linear solenoid valve, thereby controlling the hydraulic pressure applied to the hydraulic actuator.

7. The control apparatus according to claim 1, further comprising an accelerator pedal operation amount sensor providing an output signal indicative of an accelerator pedal operation amount ($A_{CC}$), wherein the set of machine readable instructions, when executed by the processor:
determine the required drive force of the hybrid vehicle based on the accelerator pedal operation amount ($A_{CC}$).

8. The control apparatus according to claim 1, wherein the set of machine readable instructions, when executed by the processor determine the required drive force of the hybrid vehicle based on an angle of opening of an electronic throttle valve.

9. A control apparatus for a hybrid vehicle provided with an engine, an electric motor, and a clutch disposed in a power transmitting path between the engine and the electric motor, the control apparatus comprising a processor and a non-transitory memory module, wherein the non-transitory memory module comprises a set of machine readable instructions that, when executed by the processor:
determine a temperature of the clutch;
determine a required drive force threshold for switching from a first drive mode to a second drive mode or for switching from the second drive mode to the first drive mode based on the temperature of the clutch, wherein in the first drive mode, the engine is placed in an operated state while the clutch is placed in an engaged state, and wherein in the second drive mode, the electric motor is exclusively used as a drive power source to run the hybrid vehicle while the engine is placed in a rest state and while the clutch is placed in a released state;
determine a required drive force of the hybrid vehicle;
switch a drive mode of the hybrid vehicle from the first drive mode to the second drive mode or from the second drive mode to the first drive mode based on a comparison of the required drive force of the hybrid vehicle to the required drive force threshold;
determine a low temperature engine start drive force threshold for switching from the second drive mode to the first drive mode when the temperature of the clutch is a lower temperature;

determine a high temperature engine start drive force threshold for switching from the second drive mode to the first drive mode when the temperature of the clutch is a higher temperature, wherein the higher temperature is higher than the lower temperature, and wherein the low temperature engine start drive force threshold is greater than the high temperature engine start drive force threshold;

determine a low temperature engine stop drive force threshold for switching from the first drive mode to the second drive mode when the temperature of the clutch is the lower temperature; and determine a high temperature engine stop drive force threshold for switching from the first drive mode to the second drive mode when the temperature of the clutch is the higher temperature, wherein the low temperature engine stop drive force threshold is greater than the high temperature engine stop drive force threshold, wherein a difference between the low temperature engine stop drive force threshold and the high temperature engine stop drive force threshold is greater than a difference between the low temperature engine start drive force threshold and the high temperature engine start drive force threshold.

10. The control apparatus according to claim 9, wherein the set of machine readable instructions, when executed by the processor:

switch the drive mode of the hybrid vehicle from the second drive mode to the first drive mode when the required drive force of the hybrid vehicle is greater than the low temperature engine start drive force threshold and the temperature of the clutch is the lower temperature;

switch the drive mode of the hybrid vehicle from the second drive mode to the first drive mode when the required drive force of the hybrid vehicle is greater than the high temperature engine start drive force threshold and the temperature of the clutch is the higher temperature;

switch the drive mode of the hybrid vehicle from the first drive mode to the second drive mode when the required drive force of the hybrid vehicle is less than the low temperature engine stop drive force threshold and the temperature of the clutch is the lower temperature; and switch the drive mode of the hybrid vehicle from the first drive mode to the second drive mode when the required drive force of the hybrid vehicle is less than the high temperature engine stop drive force threshold and the temperature of the clutch is the higher temperature.

11. A hybrid vehicle comprising an engine, an electric motor, a clutch disposed in a power transmitting path between the engine and the electric motor, and an electronic control device, wherein the electronic control device comprises a processor and a non-transitory memory module, wherein the non-transitory memory module comprises a set of machine readable instructions that, when executed by the processor:

determine a temperature of the clutch;

determine a required drive force threshold for switching from a first drive mode to a second drive mode or for switching from the second drive mode to the first drive mode based on the temperature of the clutch, wherein in the first drive mode, the engine is placed in an operated state while the clutch is placed in an engaged state, and wherein in the second drive mode, the electric motor is exclusively used as a drive power source to run the hybrid vehicle while the engine is placed in a rest state and while the clutch is placed in a released state;

determine a low temperature engine start drive force threshold for switching from the second drive mode to the first drive mode when the temperature of the clutch is a lower temperature;

determine a high temperature engine start drive force threshold for switching from the second drive mode to the first drive mode when the temperature of the clutch is a higher temperature, wherein the higher temperature is higher than the lower temperature, and wherein the low temperature engine start drive force threshold is greater than the high temperature engine start drive force threshold;

determine a required drive force of the hybrid vehicle;

switch a drive mode of the hybrid vehicle from the first drive mode to the second drive mode or from the second drive mode to the first drive mode based on a comparison of the required drive force of the hybrid vehicle to the required drive force threshold;

switch the drive mode of the hybrid vehicle from the second drive mode to the first drive mode when the required drive force of the hybrid vehicle is greater than the low temperature engine start drive force threshold and the temperature of the clutch is the lower temperature; and switch the drive mode of the hybrid vehicle from the second drive mode to the first drive mode when the required drive force of the hybrid vehicle is greater than the high temperature engine start drive force threshold and the temperature of the clutch is the higher temperature.

12. The hybrid vehicle according to claim 11, wherein the set of machine readable instructions, when executed by the processor:

determine the required drive force threshold to be a smaller required drive force threshold when the temperature of the clutch is a higher temperature; and determine the required drive force threshold to be a larger required drive force threshold when the temperature of the clutch is a lower temperature, wherein the higher temperature is higher than the lower temperature, and wherein the larger required drive force threshold is greater than the smaller required drive force threshold.

13. The hybrid vehicle according to claim 11, wherein the set of machine readable instructions, when executed by the processor:

determine a need for switching the drive mode between the first drive mode and the second drive mode; and delay generation of a command for switching the drive mode such that a length of time of the delay increases depending upon a rise of the temperature of the clutch.

14. The hybrid vehicle according to claim 13, wherein the set of machine readable instructions, when executed by the processor:

before generation of the command for switching the drive mode, determine whether the need for switching the drive mode continues to exist; and cancel the command for switching the drive mode when the need for switching the drive mode is determined not to continue to exist.

15. A hybrid vehicle comprising an engine, an electric motor, a clutch disposed in a power transmitting path between the engine and the electric motor, and an electronic control device, wherein the electronic control device comprises a processor and a non-transitory memory module, wherein the non-transitory memory module comprises a set of machine readable instructions that, when executed by the processor:

determine a temperature of the clutch;

determine a required drive force threshold for switching from a first drive mode to a second drive mode or for switching from the second drive mode to the first drive mode based on the temperature of the clutch, wherein in the first drive mode, the engine is placed in an operated state while the clutch is placed in an engaged state, and wherein in the second drive mode, the electric motor is exclusively used as a drive power source to run the hybrid vehicle while the engine is placed in a rest state and while the clutch is placed in a released state;

determine a required drive force of the hybrid vehicle;

switch a drive mode of the hybrid vehicle from the first drive mode to the second drive mode or from the second drive mode to the first drive mode based on a comparison of the required drive force of the hybrid vehicle to the required drive force threshold;

determine a low temperature engine start drive force threshold for switching from the second drive mode to the first drive mode when the temperature of the clutch is a lower temperature;

determine a high temperature engine start drive force threshold for switching from the second drive mode to the first drive mode when the temperature of the clutch is a higher temperature, wherein the higher temperature is higher than the lower temperature, and wherein the low temperature engine start drive force threshold is greater than the high temperature engine start drive force threshold;

determine a low temperature engine stop drive force threshold for switching from the first drive mode to the second drive mode when the temperature of the clutch is the lower temperature; and determine a high temperature engine stop drive force threshold for switching from the first drive mode to the second drive mode when the temperature of the clutch is the higher temperature, wherein the low temperature engine stop drive force threshold is greater than the high temperature engine stop drive force threshold, wherein a difference between the low temperature engine stop drive force threshold and the high temperature engine stop drive force threshold is greater than a difference between the low temperature engine start drive force threshold and the high temperature engine start drive force threshold.

16. The hybrid vehicle according to claim 15, wherein the set of machine readable instructions, when executed by the processor:

switch the drive mode of the hybrid vehicle from the second drive mode to the first drive mode when the required drive force of the hybrid vehicle is greater than the low temperature engine start drive force threshold and the temperature of the clutch is the lower temperature;

switch the drive mode of the hybrid vehicle from the second drive mode to the first drive mode when the required drive force of the hybrid vehicle is greater than the high temperature engine start drive force threshold and the temperature of the clutch is the higher temperature;

switch the drive mode of the hybrid vehicle from the first drive mode to the second drive mode when the required drive force of the hybrid vehicle is less than the low temperature engine stop drive force threshold and the temperature of the clutch is the lower temperature; and switch the drive mode of the hybrid vehicle from the first drive mode to the second drive mode when the required drive force of the hybrid vehicle is less than the high temperature engine stop drive force threshold and the temperature of the clutch is the higher temperature.

* * * * *